United States Patent Office.

CLOSSON P. BURGESS AND JAMES R. STEVENSON, OF ROCHESTER, NEW YORK.

Letters Patent No. 111,724, dated February 14, 1871.

IMPROVEMENT IN COMPOSITIONS FOR PAVEMENTS.

The Schedule referred to in these Letters Patent and making part of the same.

*To all whom it may concern:*

Be it known that we, CLOSSON P. BURGESS and JAMES R. STEVENSON, of Rochester, in Monroe county, in the State of New York, have invented a new and useful Composition of Materials for Pavements and other analogous uses; and we do hereby declare that the following is a full and exact description thereof, and the manner of preparing and using the same.

The object of our invention is to provide such a composition or cement as shall become very hard within a short time after it is applied to use, shall resist moisture, and also be free from very coarse ingredients, and sufficiently plastic or semi-fluid that it may be introduced within narrow or small apertures, as herein more fully set forth.

We divide the materials of which our new paving composition is composed into two classes, the first class consisting of the grosser and heavier materials, and the second class, which we term the drying and hardening compound, consisting of the finer and more liquid materials.

In class first we use five (5) parts of fine gravel; two (2) parts of pulverized resin; three (3) parts of coal-ashes; one (1) part of water-lime; one (1) part of pulverized marble; and three (3) parts of coal-tar.

These ingredients are to be thoroughly mixed together preparatory to being mixed with the composition formed of the second class of the ingredients, which are the following, to wit: Four (4) parts of coarse sand; one (1) part of plaster of Paris; one (1) part of litharge; one (1) part of linseed-oil; and two (2) parts of coal-tar, all mixed together.

The process of compounding and using our composition is to first prepare class first of the ingredients in the relative proportions specified.

This part of the composition may be prepared at any convenient time before the second class of materials is mixed; but as soon as the second class of ingredients, which includes most of the drying and hardening materials, is prepared, the two classes constituting the composition must be promptly commingled and used before the drying and hardening action begins, as the semi-fluid condition of the composition is necessary to its application within narrow or small apertures and grooves through which it may be required to introduce it.

Our composition is intended more especially to be used to fill up the apertures of a wooden structure for paving streets invented by us, and for which we have applied for Letters Patent of even date herewith.

The linseed-oil is not intended in our composition to merely prevent the wood of which the pavement is composed from decaying, but it also modifies the nature of the plaster and other drying and hardening materials, so as to counteract their tendency to absorb humidity; and for this reason the second class of ingredients is prepared by itself, as by so doing the plaster and litharge are brought into closer relation with the oil and coal-tar than would be the case if all the ingredients were mixed together in the first instance.

Having thus fully described our improved composition for pavements and other analogous uses,

What we claim, and desire to secure by Letters Patent, is—

The composition for pavements, consisting of the ingredients in the proportions specified, classified, prepared, and used in the manner and for the purposes described.

In testimony whereof we hereunto set our hands this 3d day of January, A. D. 1871.

CLOSSON P. BURGESS.
JAMES R. STEVENSON.

Witnesses:
H. P. K. PECK,
J. P. VARNUM.